Sept. 30, 1958  G. W. BENJAMIN  2,854,217
EQUIPMENT FOR OPERATING IN MINES
Original Filed April 15, 1950  10 Sheets-Sheet 1
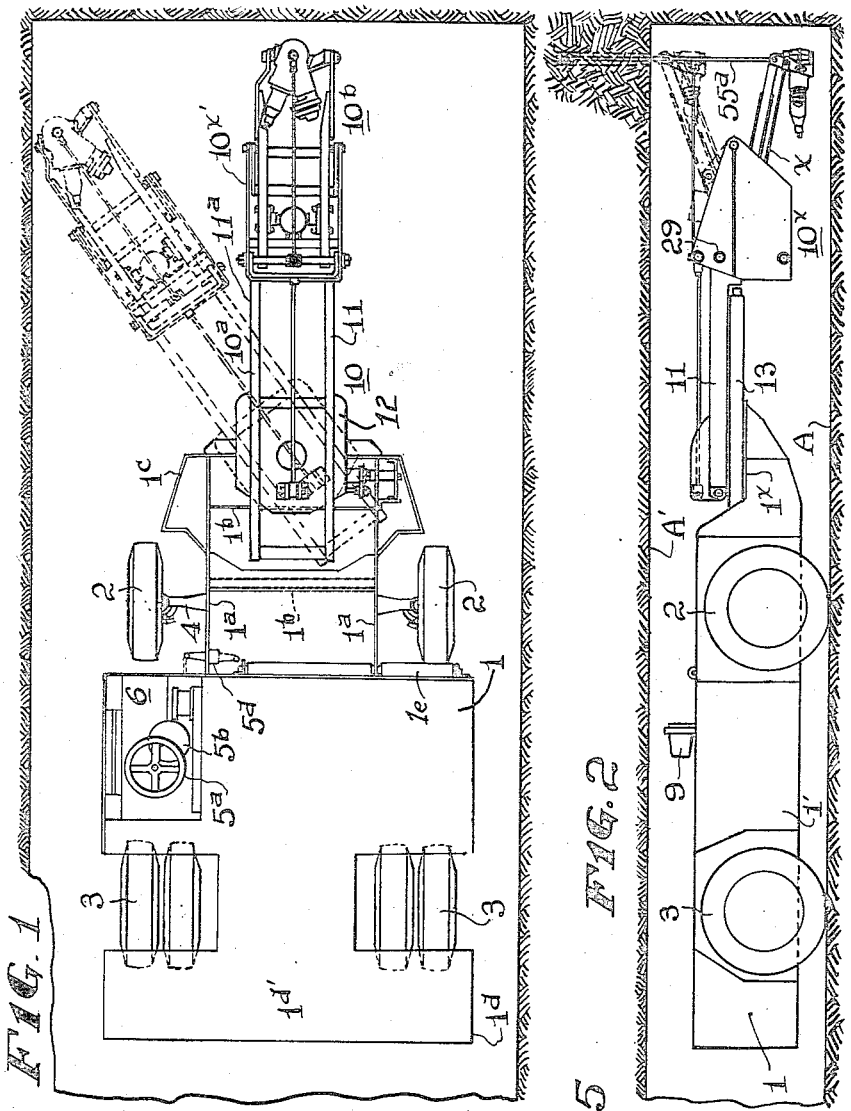
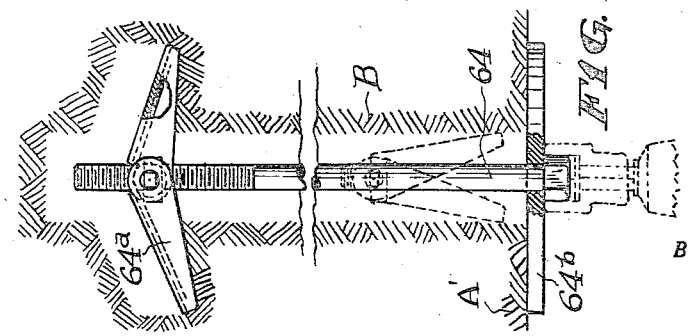
INVENTOR.
GEORGE W. BENJAMIN.
BY
*Geo. B. Pitts*
ATTORNEY

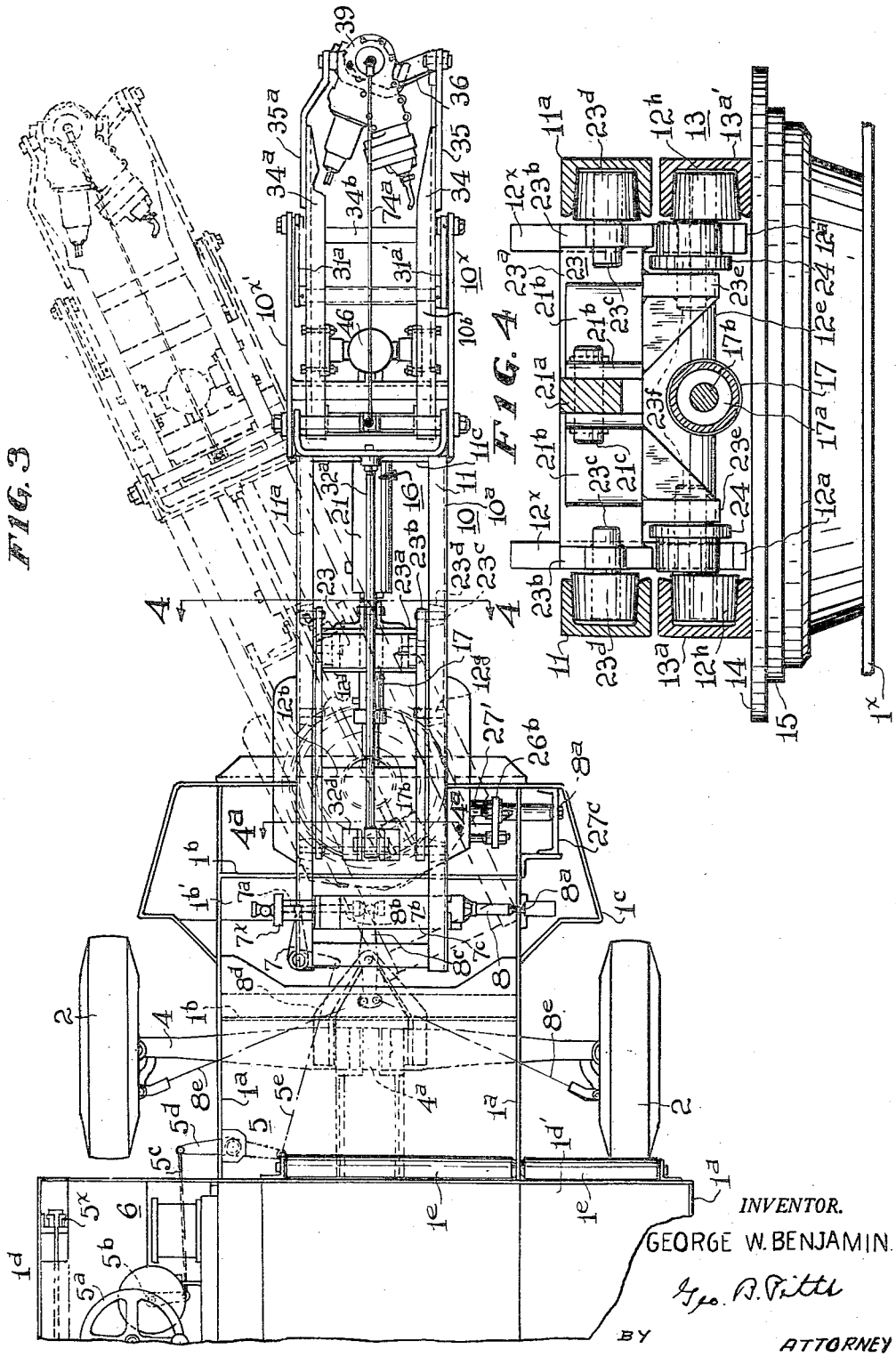

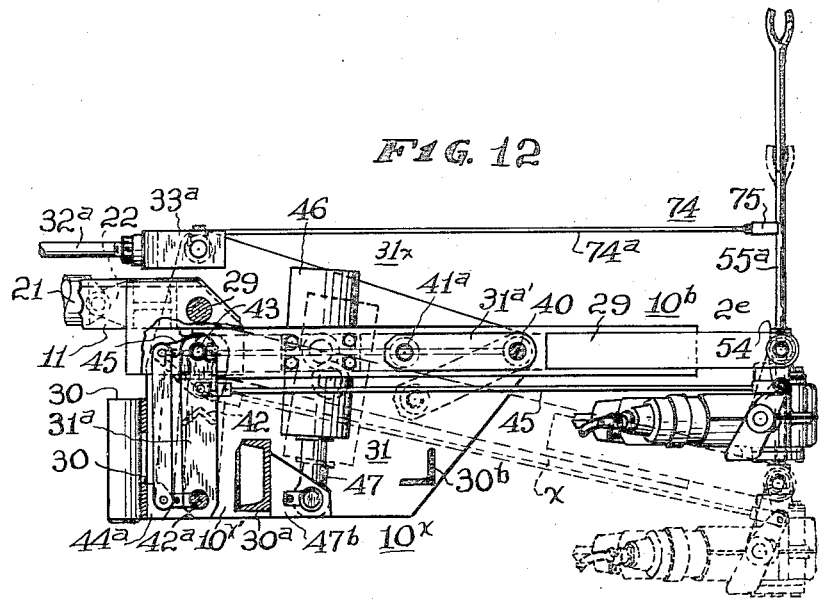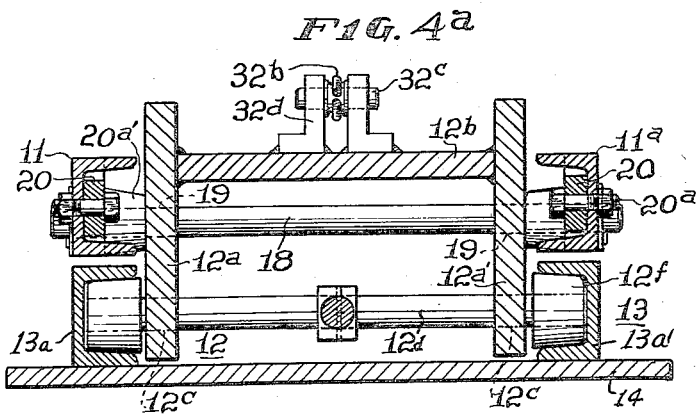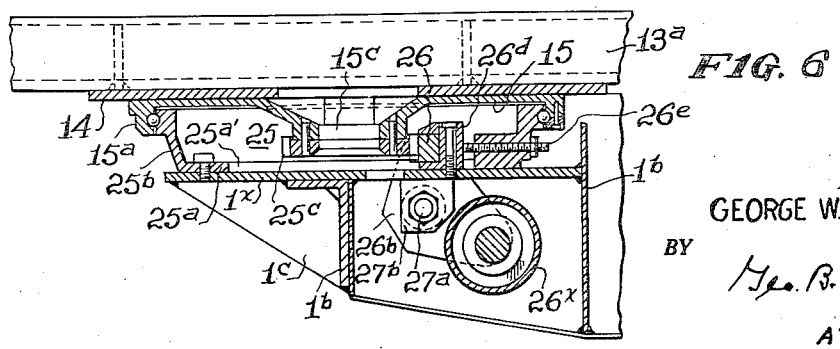

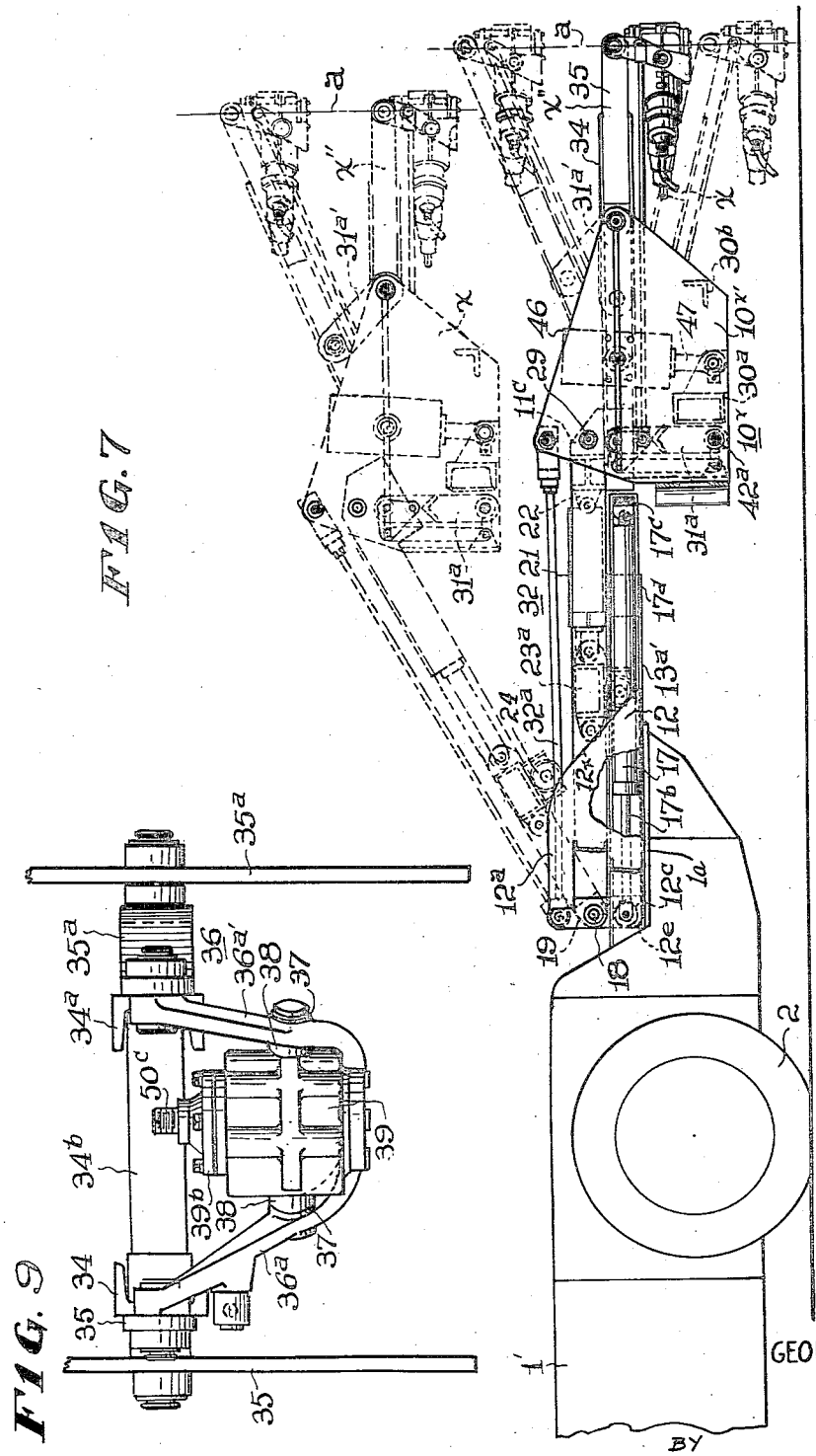

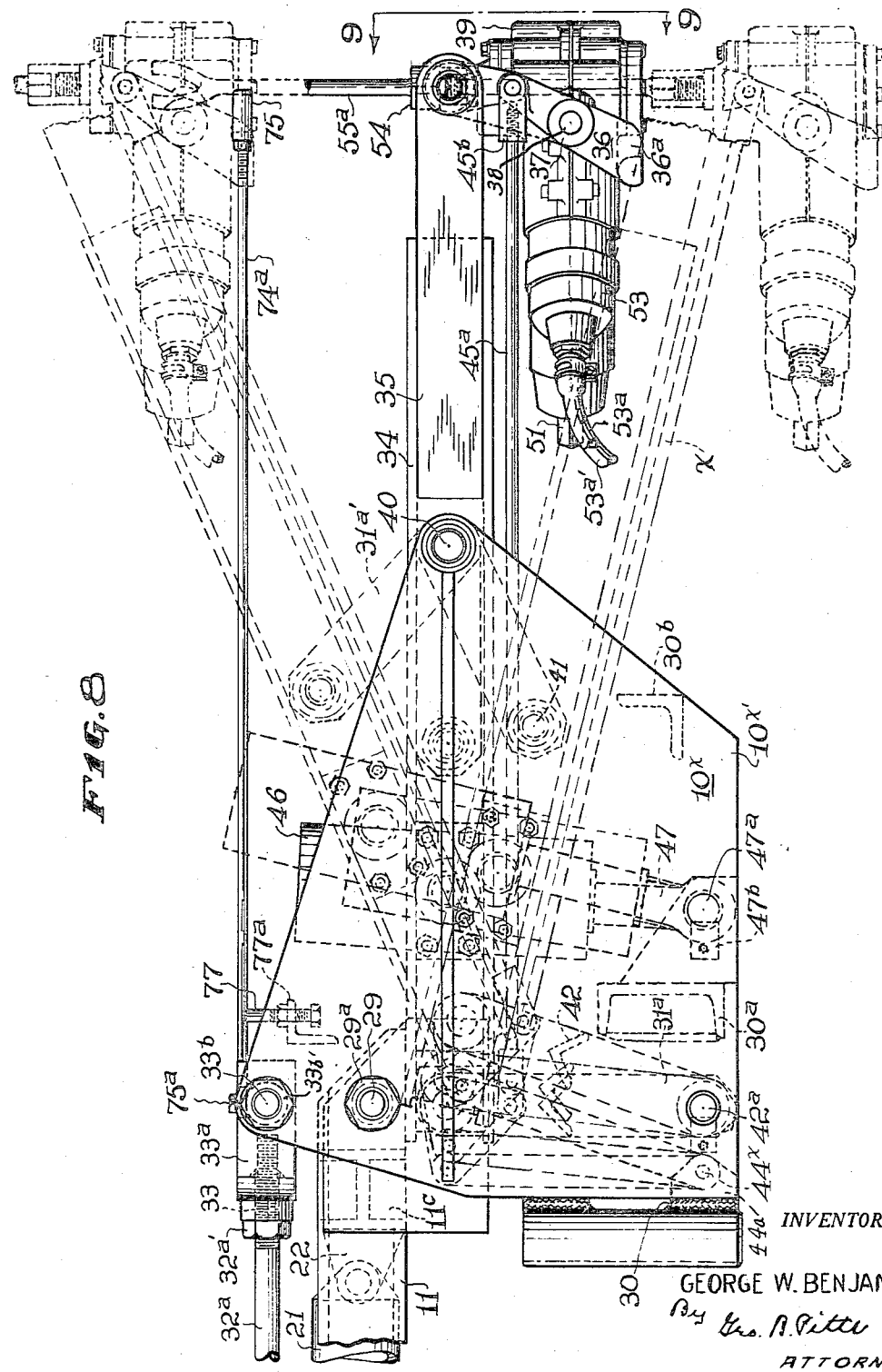

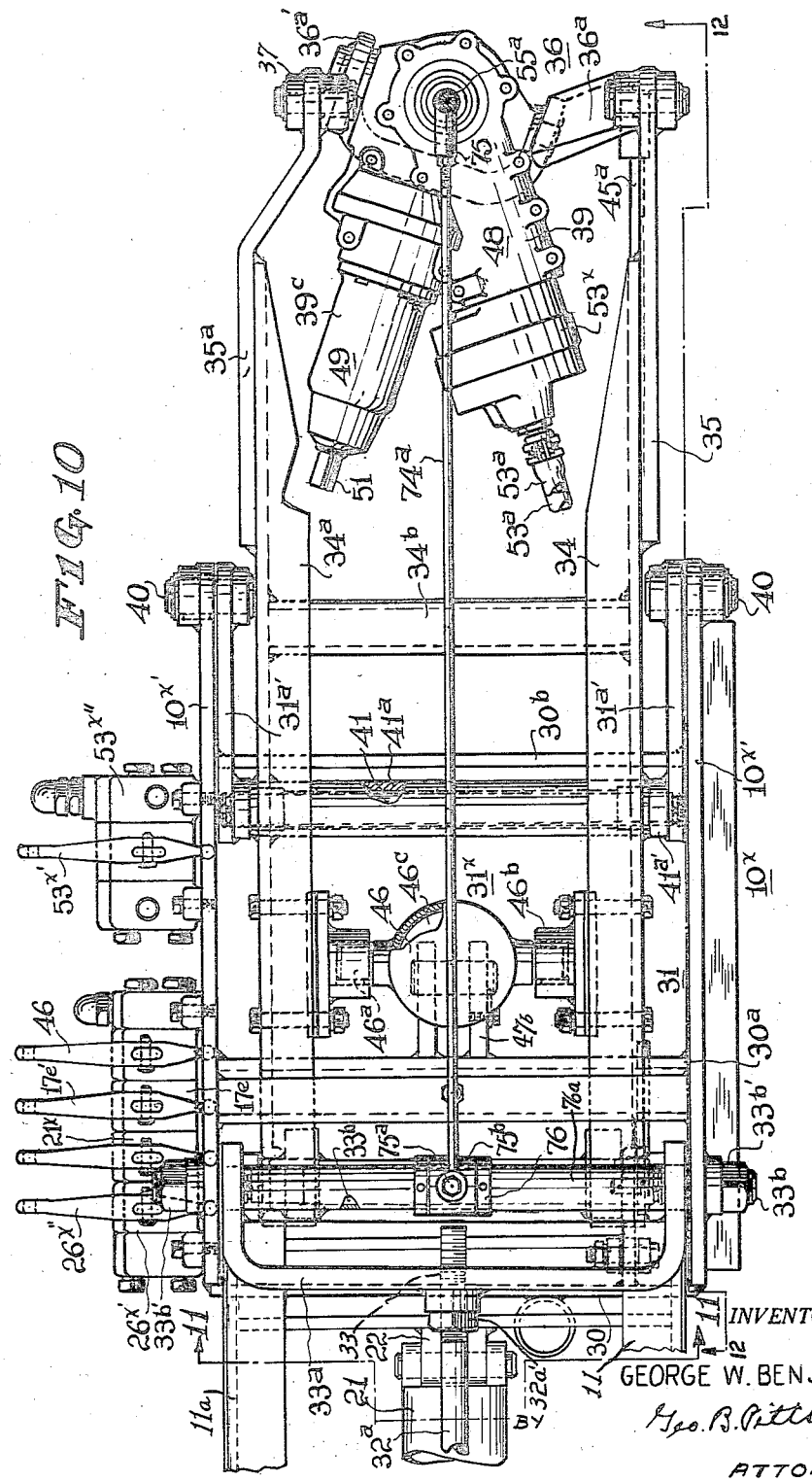

Sept. 30, 1958  G. W. BENJAMIN  2,854,217
EQUIPMENT FOR OPERATING IN MINES
Original Filed April 15, 1950  10 Sheets-Sheet 8
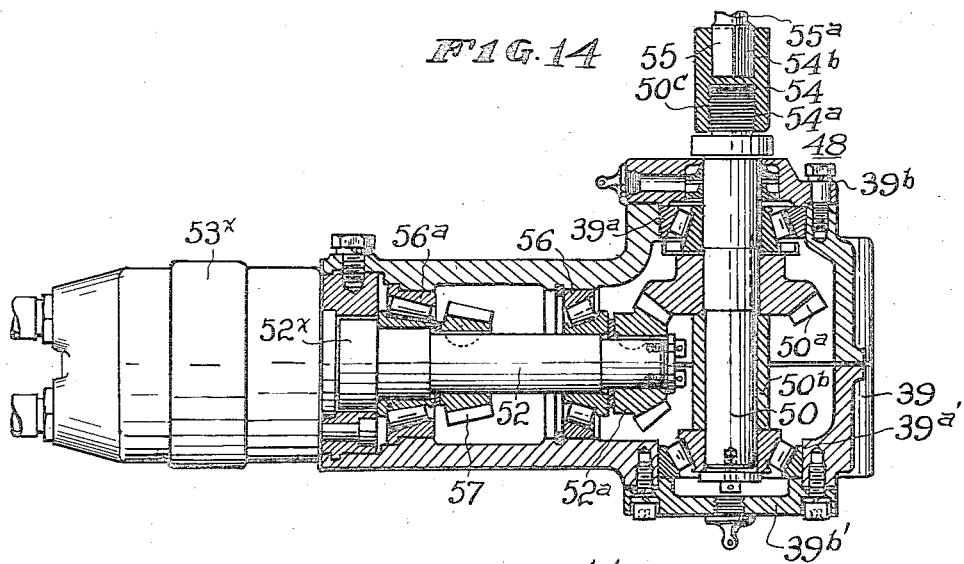
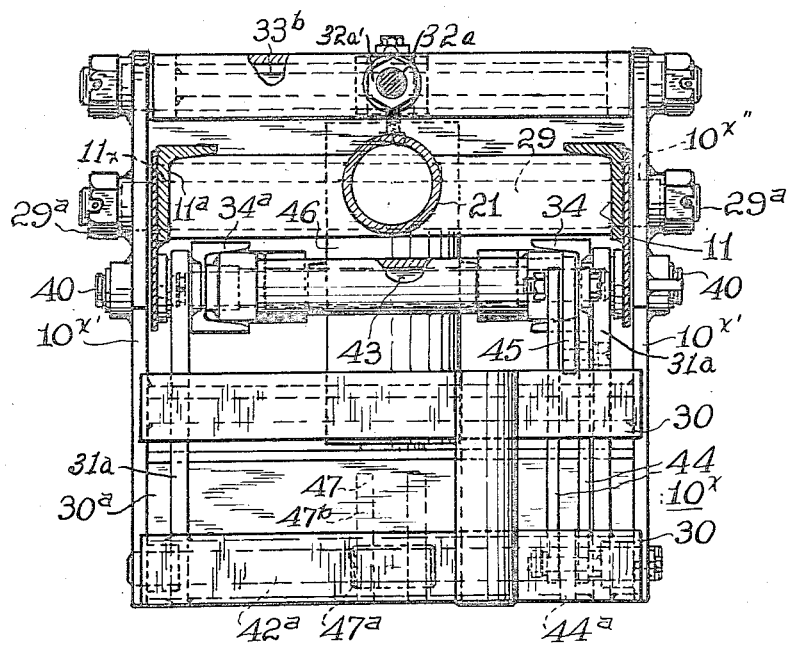
INVENTOR.
GEORGE W. BENJAMIN.
BY
Geo. B. Pitts
ATTORNEY

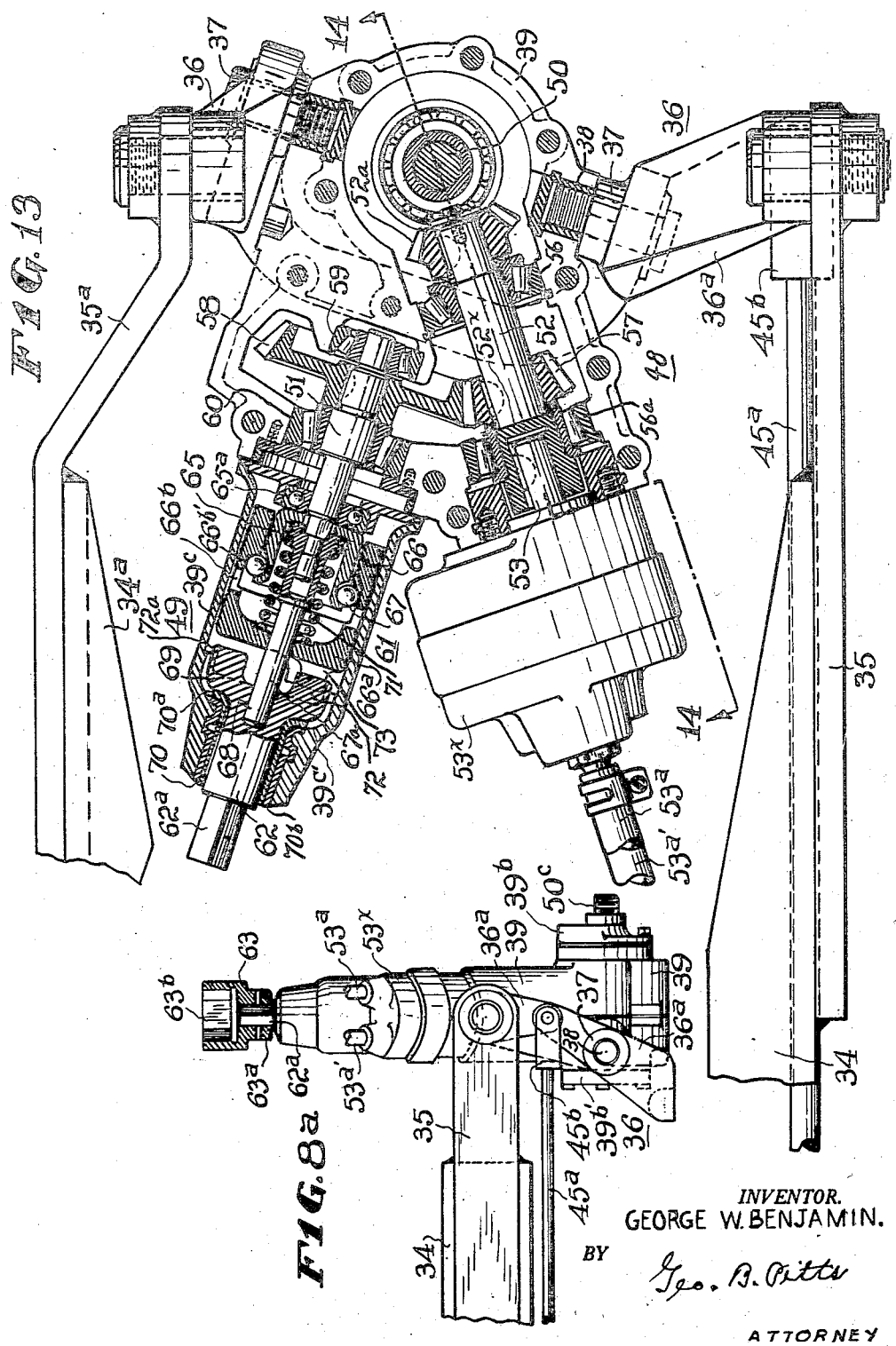

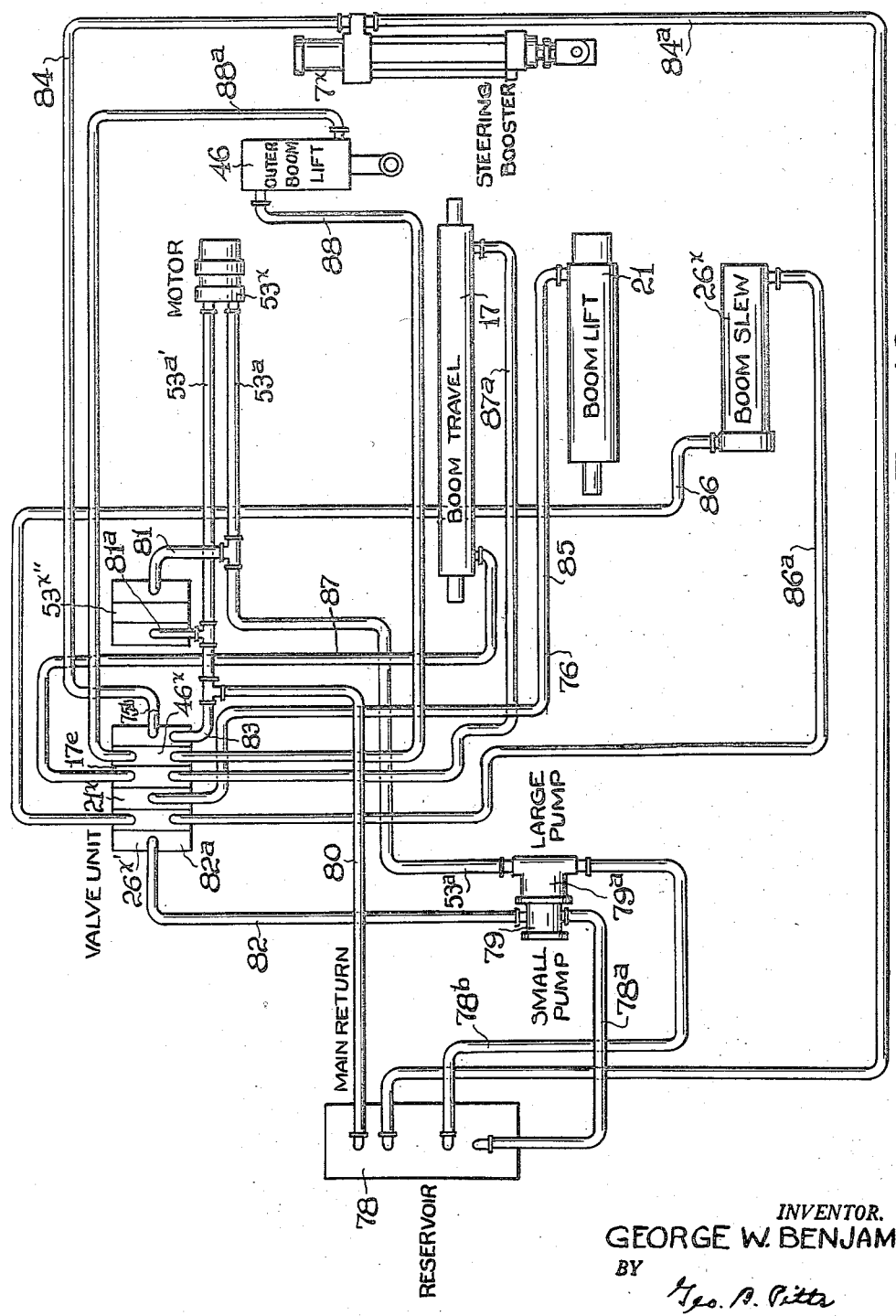

United States Patent Office 2,854,217
Patented Sept. 30, 1958

2,854,217

EQUIPMENT FOR OPERATING IN MINES

George W. Benjamin, Huntington, W. Va., assignor, by mesne assignments, to Otis Elevator Company, New York, N. Y., a corporation of New Jersey Continuation of application Serial No. 156,180, April 15, 1950. This application August 20, 1957, Serial No. 679,322

23 Claims. (Cl. 255—51)

This invention relates to an industrial truck or trucks and more particularly to industrial trucks provided with equipment for carrying out certain operations in mines, mine shafts and like excavated areas. This application is a continuation of my application, Serial No. 156,180, filed April 15, 1950, and now abandoned.

The preferred embodiment of my invention includes a motor driven truck and a boom thereon supporting certain driven mechanisms, capable of translation and operation in mine shafts having low ceilings or roofs. The boom is movably supported at its inner end, whereby it can be swung vertically, slewed in either direction and also bodily moved endwise. The mechanisms include a power driven shaft mounted on the outer end of the boom whereby drilling and other operations may be readily carried out to facilitate time and labor. The invention also includes a sectional, articulatable boom, an operated mechanism thereon and compensating connections for the latter, whereby the mechanism is maintained coincident with a predetermined path while the boom is being operated vertically.

The boom supported mechanism is adapted for (a) drilling, in a rapid manner, holes of various depths in ceilings or roofs of mine shafts, where these ceilings or roofs may be of varying heights, each hole serving to accommodate a bolt carrying a roof engaging plate and provided on its inner end with expansible devices, which— upon rotation of the bolt—engage the surrounding earth formation to secure the bolt in position and (b) engaging the heads of the bolts to rotate the latter, whereby the expansible devices are forced into engagement with the surrounding earth formation to secure the bolt in fixed position therein with the roof engaging plates rigidly bolted face-to-face to the roof.

One object of the invention is to provide an improved truck having a vertically movable boom carrying at its outer end a cradle or supporting mechanism and connections between the mounting for the boom and the cradle or load carriage for maintaining the latter level during movement of the boom vertically.

Another object of the invention is to provide a truck for operation in excavated shafts, passages and like areas, having an improved mechanism for drilling holes in the walls of shafts and passages.

Another object of the invention is to provide in a truck an improved boom provided at its outer end with a power driven shaft for rotating a drill or other device and means for maintaining the shaft in a predetermined axial position during movement thereof vertically.

Another object of the invention is to provide in a truck an improved boom provided at its outer end with power driven mechanisms for operating drills for drilling holes in the walls of excavated shafts and passages and securing bolts in the holes.

Another object of the invention is to provide in a truck, an improved boom consisting of inner and outer sections, the inner section being movably supported on the truck for movement vertically, laterally in either direction and longitudinally and the outer section being supported on the inner section for movement upwardly and downwardly in the plane thereof and supporting on its outer end a power driven mechanism or load supporting device.

A further object of the invention is to provide in a truck, an improved boom consisting of a support rotatable on the truck frame on a vertical axis, an inner section pivotally and slidably supported at its inner end on the support and an outer section swingably supported on the inner section and carrying at its outer end a load supporting device.

A still further object of the present invention is the provision of a new and improved vehicle having a horizontally translatable support thereon, a boom member, and an element connected to the boom member for angular movement with respect thereto, the boom member being connected to the support for angular movement in a vertical plane by means pivoted to the boom member and to the support and the element and boom member being moved relative to each other in a predetermined manner as the boom is swung by a linkage interconnecting the support and the element.

Other objects of the invention will be apparent to those skilled in the art to which my invention relates from the following description taken in connection with the accompanying drawings, wherein Fig. 1 is a plan view showing somewhat diagrammatically a truck provided with equipment embodying my invention;

Fig. 2 is a side elevation of parts shown in Fig. 1;

Fig. 3 is a fragmentary plan view of parts shown in Figs. 1 and 2, somewhat enlarged;

Figure 5:
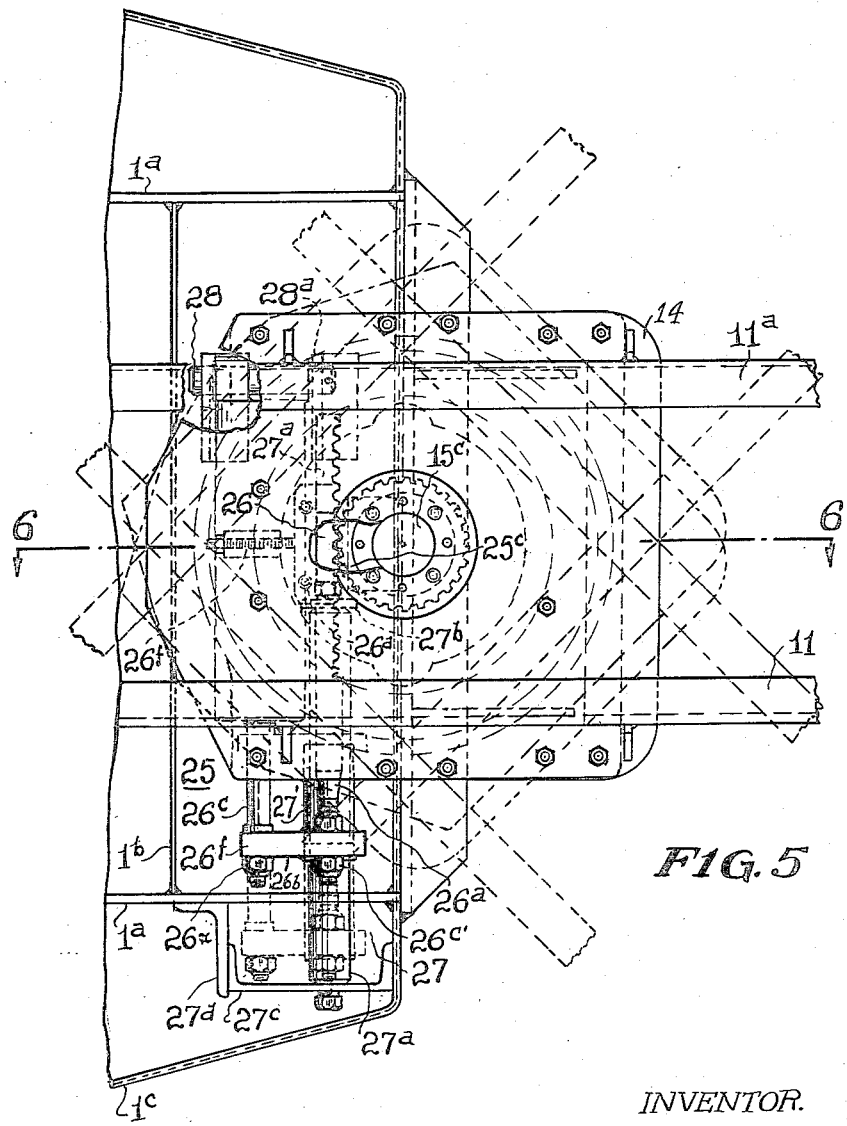

Figs. 4 and 4a are sections on the lines 4—4 and 4a—4a, respectively, of Fig. 3;

Fig. 5 is a fragmentary plan view of parts shown in Figs. 3 and 6, portions being broken away;

Fig. 6 is a fragmentary section on the line 6—6 of Fig. 5;

Fig. 7 is a fragmentary side elevation of parts shown in Figs. 1, 2 and 3, showing in dotted lines various positions of the boom, parts being broken away.

Fig. 8 is a side elevation of parts shown in Fig. 7, enlarged;

Fig. 8a is a fragmentary side elevation of parts shown in Fig. 8, but showing the operating mechanism in a different position;

Fig. 9 is an elevational view on the line 9—9 of Fig. 8;

Fig. 10 is a fragmentary plan view (enlarged) of parts shown in Figs. 3, 7 and 8;

Fig. 11 is a section on the line 11—11 of Fig. 10;

Fig. 12 is a fragmentary section on the line 12—12 of Fig. 10;

Fig. 13 is a fragmentary plan view of parts shown in Figs. 3, 7, 8, 10 and 12, partly in section;

Fig. 14 is a section on the line 14—14 of Fig. 13;

Fig. 15 is a view through the ceiling of a shaft and showing a plate positioned against the ceiling; and Fig. 16 is a diagram of the hydraulic system.

In the drawings, 1 indicates as an entirety a truck having a chassis 1' of suitable construction mounted on front steerable wheels 2 and rear driven wheels 3. As shown in Figs. 1 and 2, the truck is adapted for carrying out certain operations in an excavated area A, such as shafts in mines, and therefore is of low height. The front end portion of the chassis 1' consists of spaced side members 1a, spaced transverse cross members 1b connected to the side members 1a and guards 1c disposed forwardly of the wheels 2 and supporting a base 1x on a level below the top of the chassis 1'. The wheels 2 are dirigibly mounted on the opposite ends of an axle 4, which in turn is trunnioned on a shaft 4a disposed centrally and longitudinally of the chassis 1', as shown in dotted lines in Fig. 3. The mechanism indicated as an entirety at 5 for steering the wheels 2 consists of the following: 5a indicates a manually operated device, such as a wheel (Figs. 1 and 3), disposed at the station 6. The wheel 5a is drivingly connected to a column 5b mounted in the control station 6. The column 5b is provided with an arm, which is pivotally connected to one end of a link 5c, the opposite end of the link being pivotally connected to one end of a lever 5d. The lever 5d is fulcrumed on a bracket supported on the adjacent side member 1a. The opposite end of the lever 5d is pivotally connected to the outer end of a link 5e. The inner end of the link 5e is pivotally connected to one arm of a bell-crank 7, which is suitably mounted on a hanger (not shown) fixed to the plate 1b'. The other arm of the bell-crank 7 is connected at its outer end with a valve operating member 7a extending into a valve mechanism 7x for a fluid operated device indicated as an entirety at 7b. The device 7b consists of a cylinder 7c, a piston therein connected to a rod 8. The outer end of the rod 8 is connected by a suitable ball-and-socket joint 8a to the adjacent side member 1a (see Fig. 3). As will be observed, the ball-and-socket joint 8a permits the cylinder 7c and rod 8 to swing about the axis of the joint to compensate for any rocking movement of the axle 4. The outer end of the casing for the valve mechanism 7x (which casing is fixed to the cylinder 7c) is provided with a depending arm (not shown), the arm in turn being connected to the outer end of a drag link 8b. The inner end of the drag link 8b is connected to one end of a rocker 8c fulcrumed on a bracket 8d, which is supported on the axle 4. The outer end of the rocker 8c is connected by links 8e to the spindles for the wheels 2. In this arrangement the cylinder 7c moves relative to the piston therewithin to operate the rocker 8c.

As certain of the parts above described may be of any desired form of construction, they are shown diagrammatically and are not illustrated in detail.

The rear wheels 3 are driven by a suitable motor supplied with electric current from a suitable source, such as batteries, the motor and batteries not being shown. The liquid reservoir, the pump for supplying fluid under pressure to the various fluid operated mechanisms later referred to, are shown diagrammatically in Fig. 16. The pump and the motor for driving the pump and other accessories are mounted within the chassis side plates 1d and below the top wall 1d' as a protection for the operatives and to prevent the elements, dust and other foreign matter from accumulating on these parts and accessories. These parts are of standard construction and therefore they are not illustrated in detail. The top 1d' extends over a large portion of the chassis 1' to permit various tools, drills and parts to be supported thereon. Suitable rollers 1e are provided along the front end of the top 1d' and serve as a support for the inner ends of elongated devices (which may be ladders, shovels, poles and the like), the rollers facilitating laying the devices on the top and removing them therefrom. The top 1d' is cut away to provide the driver's station 6, which, in addition to the steering device 5a and brake pedals 5x, is provided with suitable devices (not shown) for operating the travel motor, the motor for driving the pump and for operating the lamp 9. The station 6 may also include one or more valves and the operating levers therefor for controlling the supply of liquid under pressure to the various fluid operated devices later referred to, but by preference these valves are mounted on the boom as shown in Fig. 10.

10 indicates as an entirety a boom consisting of an inner section 10a and an outer section 10b mounted on the outer end of the boom section 10a, for movement relative thereto. The inner boom section 10a consists of spaced members 11, 11a preferably of channel shape in cross section, the walls thereof providing guides for a purpose later set forth. The members 11, 11a suitably connected together by cross members, one thereof being shown at 11c (Fig. 8), and swingably supported at their inner ends on a transverse shaft mounted on a carriage 12, which in turn is slidably mounted on a support 13 for movement rectilinearly thereof. The support 13 consists of spaced channel members 13a, 13a', suitably fixed to a base 14, the latter being supported on a turntable 15 (Figs. 4, 5 and 6), whereby the carriage 12 and boom 10 may be slewed in either direction, as later set forth (see dotted lines in Figs. 3 and 5). Fluid operated means, indicated as an entirety at 16, are provided between the carriage 12 and boom section 10a for swinging the boom 10 upwardly and controlling its movement downwardly. The carriage 12 consists of a pair of vertically disposed plates 12a, 12a', rigidly connected adjacent their upper ends by a horizontal plate 12b. The rear ends of the plates 12a, 12a', and the forward portions thereof adjacent their lower ends are respectively formed with aligned openings 12c, 12d. A shaft 12e extends through the openings 12c and outwardly of the plates 12a, 12a', mounts rollers 12f, which roll on the side walls of the channels 13a, 13a', whereas stud shafts 12g are mounted in the openings 12d and extend outwardly of the plates 12a, 12a', and support rollers 12h for engagement with the side walls of the channels 13a, 13a'. It will thus be observed that the pairs of rollers 12f, 12h, through their engagement with the side walls of the channels 13a, 13a', guide the carriage 12 endwise of the latter when it is moved in either direction, as later set forth. As shown in Figs. 3, 4 and 7, the upper edge portions of the plates 12a, 12a', intermediate their ends, serve as cams 12x for a purpose later set forth. The carriage 12 may be moved outwardly and inwardly along its guides 13a, 13a', by a fluid operated mechanism consisting of a cylinder 17 having a reciprocatable piston 17a connected by a rod 17b to the shaft 12e, as shown in Figs. 4, 4a and 7. The outer end of the cylinder 17 is pivotally connected to a bracket provided on a cross member 17c adjacent the outer end of the channels 13a, 13a'. The opposite ends of the cross member 17c are connected to the outer ends of spaced bars (not shown) the inner ends of which are secured to pads (one being shown at 17d— Fig. 7) fixed to the inner walls of the channels 13a, 13a'. This form of construction provides clearance for parts of the mechanism for raising the boom 10. The cylinder 17 is provided with suitable fluid connections at its opposite ends, suitably connected in the fluid system, as shown in Fig. 16, so that by means of a control valve 17e having an operating lever 17e' (Fig. 10), fluid under pressure may be supplied to either end of the cylinder and the fluid in the latter discharged from its opposite end to move the piston 17a in either direction.

The pivotal connection between the inner end of the boom 10 and carriage 12 consists of the following: 18 indicates a shaft extending through aligned openings 19 formed in the plates 12a, 12a', and aligned openings formed in the bottom walls of the channels 11, 11a, cotter pins on the opposite ends of the shaft 18 serving to prevent endwise movement of the latter, 20 indicates a fitting seated between the side walls of each channel 11, 11a, and secured at one end to the bottom wall thereof by a bolt 20a (see Fig. 4a); the opposite end of each fitting terminates in a hollow boss 20a', aligned with the adjacent opening 19 so as to provide a bearing for the adjacent end portion of the shaft 18. As will be understood, the shaft 18 forms a pivot for the boom 10 and as the shaft 18 is mounted on the carriage 12, the boom 10 moves therewith in either direction. The hydraulically operated mechanism, indicated as an entirety at 16, for raising the boom 10 consists of the following; 21 indicates a cylinder the outer end of which is pivotally mounted between a pair of brackets 22 secured to the inner side wall of the cross member 11c (Fig. 8). The cylinder 21 is provided with a reciprocatable piston, which is connected to a rod, the latter in turn being connected to a slide 23 movably mounted on the boom channels 11, 11a, and operated inwardly (toward the left as viewed in Fig. 3) by the piston in the cylinder 21, the effect of which is to swing the boom upwardly, as later set forth. The outer end of the piston rod is provided with an apertured lug 21a fitting between the legs of angle members 21b fixed to the slide 23 (see Fig. 4) and formed with aligned openings, so that a pin 21c extending through these openings and the lug 21a serves to connect the piston rod and slide 23 together (Figs. 3 and 4). The slide 23 consists of the following: 23a indicates a transversely disposed channel member provided at its opposite ends with elongated side plates 23b positioned inwardly of and parallel to the channels 11, 11a, the plates 23b extend beyond the opposite sides of the channel member 23a. The opposite ends of each plate 23b support stud shafts 23c which extend outwardly and rotatably support rollers 23d, the rollers 23d in turn having rolling engagement with the side walls of the adjacent channel 11 or 11a. 23e, 23e, indicate U-elements fixed to and depending from the bottom wall of the channel member 23a adjacent its opposite ends (Fig. 4). The bottom wall of each U-element supports a stud shaft 23f the outer end of which supports a flanged roller 24 arranged to engage and roll on the adjacent cam 12x (see Figs. 3 and 4).

As will be understood, fluid under pressure is supplied to one end of the cylinder 21 by operation of a suitable valve 21x in the fluid system to one position to raise the boom. The fluid is supplied under pressure to the outer end of cylinder 21 to move the slide 23 toward the lift, as viewed in Figs. 3 and 7; in such movement the rollers 24 will ride the cams 12x to the position shown in dotted lines in Fig. 7 and thus swing the boom upwardly. By supplying the fluid as above set forth, the boom 10 may be swung upwardly to any desired height and upon reaching the desired elevation the boom may be maintained in such position by moving the valve to its neutral or cut-off position. In this position of the boom 10 the carriage 12 may be bodily moved endwise, as already set forth; also, the support 13 for the carriage 12 may be slewed in either direction, as later set forth, to adjust or swing the boom laterally. By operating the valve 21x to its other position pressure on the piston in the cylinder 21 is relieved to permit the boom 10 to gravitate to its lower position and the liquid to return to the valve, as later set forth. By operation of the valve, the boom 10 may be swung upwardly and downwardly to various intermediate positions in order to position the boom section 10b in any desired elevated position.

25 indicates as an entirety fluid operated means for slewing the carriage support 13, these means consisting of the following; 25a indicates a base member suitably mounted on the base 1x (see Fig. 6) and formed with an axial opening 25a'. The base member 25a is integrally connected to an annular wall 25b, the periphery of which is formed with a race for anti-friction elements, such as balls, fitting a race formed in the annular depending flange 15a on the turntable 15. The turntable 15 is formed with an axial opening 15c through which and the opening 25a' the fluid supply and discharge pipes for the cylinders 17, 21, and other hydraulically operated mechanisms (later referred to) pass. The opening 15c is provided with a depending collar shaped to form a seat to which the annular hub of a pinion 25c is fixedly mounted. 26 indicates a rack engaging the pinion 25c and movable endwise to rotate the latter and turntable 15, whereby the carriage support 13, carriage 12 and boom 10 may be slewed in either direction from the position shown in Fig. 3, over a wide range to meet various conditions in a mine. The rack 26 is provided at one end with a shank 26a which terminates in a screw threaded end portion extending through an opening in one end portion of an operating plate 26b, the shank 26a being adjustably rigidly connected to the plate 26b by nuts 26b'. The opposite end portion of the plate 26b is formed with an opening through which the outer end of a rod 26c extends, the rod being provided with a collar which abuts the inner side of the plate and having on its outer end a nut 26" which is tightened against the outer side of the plate 26b to secure the rod 26c thereto. The inner end of the rod 26c extends into a cylinder 26x (see Fig. 6) and provided with a piston, so that by the supply of fluid under pressure to either end of the cylinder and discharge of the fluid from the opposite end thereof, the piston may be operated to effect movement of the plate 26b and move the rack 26 endwise. The supply of fluid to and from the cylinder is controlled by valve 26x' having an operating lever 26x". 26d indicates a guide block for the rack 26 disposed tangentially of the gear 25c and providing a guideway for the contiguous portions of the rack during engagement of its teeth with the gear 25c. The block 26d is bolted to the base 1x and engaged by a back-up screw 26e to insure engagement of the rack 26 with the gear 25c throughout the movement of the rack in either direction. The plate 26b is guided in its movement by guide devices 27, so that the movement of the rack 26 by the piston rod 26c will be endwise and parallel thereto. The guide devices for the plate 26b preferably consists of a rod 27a, which is supported at its inner end by a lug 27b depending from the base 1x and at its opposite end by a channel 27c mounted on the adjacent guard 1c and an angle 27d, and a sleeve 27', which is fixed to the plate 26b, slidably fitting the rod 27a. The sleeve 27' is relatively long to provide a long bearing on the rod 27a and thus maintain the plate 26b at right angles to the piston rod 26c. The outer end of the cylinder 26x is pivotally supported by means of a pin 28 supported at its opposite ends by angles 28a depending from the base 1x.

10x indicates as an entirety a connecting member between the inner boom section 10a and the outer boom section 10b pivotally mounted on the outer end of the inner boom section 10a. The element 10x serves as an auxiliary support on which the outer boom section 10b is movably supported as later set forth. The auxiliary support 10x consists of a pair of plates 10x', 10x', the inner portions of which are disposed at the opposite outer sides of the channels 11, 11a, and formed adjacent their rear ends with aligned openings 10x" which register with aligned openings 11x formed in the outer end portions of the channels 11, 11a, for a rod 29 which extends through these openings to pivotally support the plates on the outer end of the inner boom section 10a. The opposite ends of the rod 29 are provided with screw threads engaged by nuts 29a to prevent endwise movement of the rod 29. The plates 10x' are rigidly connected together by cross members 30, 30 (see Fig. 11), a channel 30a and an angle 30b. As later set forth, as the driven mechanisms on the outer end of the outer boom section 10b are maintained in a predetermined position during movement of the latter upwardly and downwardly, a mounting, indicated as an entirety at 31, is provided for movably supporting the outer boom section 10b on and between the plates 10x', 10x'. In this arrangement, as the mounting 31 for the boom section 10b is mounted on the support 10x and operates to move the boom section relative thereto, the support 10x must be maintained in a plane, that is, the plane of the support 13 or a plane parallel thereto, in all positions of the inner boom section 10a, as shown in Fig. 7. For this reason, I provide connections, indicated as an entirety at 32, between the auxiliary support 10x and the carriage 12. The connections 32 consist of the following; 32a indicates a rod the inner end of which terminates in a loop 32b (Fig. 4a) through which a pin 32c extends. The opposite ends of the pin 32c are supported in the upstanding legs of spaced angles 32d suitably secured to the plate 12b midway the plates 12a, 12a', the axis of the pin 32c being in a vertical plane which cuts the axis of the rod 18. The outer end portion of the rod 32a is provided with screw threads and extends through a screw threaded opening 33 formed in a yoke 33a, the rod 32a and yoke being locked by a nut 32a'. The opposite ends of the yoke 33a are formed with aligned openings through which a rod 33b loosely extends to permit the yoke 33a to swing thereon when the boom section 10a is swung upwardly as shown in dotted lines in Fig. 7. The opposite ends of the rod 33b extend through and are supported in aligned openings formed in the plates 10x' and held against endwise movement by nuts 33b' threaded on the end portions of the rod. As shown in dotted lines in Fig. 7, the connections 32 are related to the pivot 18 for the boom section 10a and pivot 29 for the auxiliary support 10x, so that when the boom section 10a is raised, the support moves therewith but is maintained level.

The outer boom section 10b is disposed in endwise relation to the boom section 10a and consists of a pair of spaced channels 34, 34a, connected together by a bar 34b; whereas their outer ends are provided with extensions 35, 35a, respectively, between which a carrier or cradle 36 is pivotally supported. The legs 36a, 36a', of the cradle are provided with aligned bearings 37 in which the trunnions 38 on the side wall of a housing, indicated as an entirety at 39, rotate, whereby the latter may be swung from a horizontal position as shown in Figs. 1, 2, 3, 7, 8, 10, 12 and 13 to a vertical position as shown in Figs. 8a and 15. The housing 39 encloses the mechanisms, later described, for carrying out the operations already referred to.

The mounting for the boom section 10b consists of the following: 31a, 31a', indicate inner and outer pairs of spaced links, respectively, connected to and disposed between the channels 34, 34a, and plates 10x' and swingable in planes parallel thereto. 31x indicates as an entirety mechanism (preferably hydraulically operated) supported on the support 10x and connected to the boom section 10b for supporting it in normal position (that is, horizontally with respect to the support 10x as shown in Figs. 7, 8 and 12) and for swining the boom section 10b upwardly and downwardly. When the boom section 10b is in its normal position the links 31a' are in the same position and extend endwise inwardly of the channels 34, 34a, whereas the links 31a are disposed generally vertically generally perpendicularly to the channels 34, 34a. The outer ends of the links 31a' are pivotally supported on aligned pivots 40 suitably mounted in the outer end portions of the plates 10x', whereas their inner ends are pivotally connected to a cross rod 41 rotatably fitting and extending through a sleeve 41a (see Fig. 10), which in turn is fixedly mounted at its opposite ends in and extends through openings formed in the channels 34, 34a, the outer ends of the sleeve 41a being provided with housings 41a' containing antifriction bearings for the rod 41. The links 31a are rigidly connected together by an angle 42 and swingably mounted at their lower ends on a shaft 42a suitably supported in aligned openings formed in the lower portion of the plates 10x'. The upper ends of the links 31a are pivotally connected to a cross rod 43, the opposite ends of which are suitably supported in the inner end portions of the channels 34, 34a. From the foregoing description it will be observed from Figs. 7 and 8 that when the swinging mechanism 31x is operated as later set forth to swing the channels 34, 34a, upwardly or downwardly relative to their normal position, the pairs of links 31a, 31a', operate simultaneously to move the channels 34, 34a, outwardly, for a purpose later set forth. As already set forth, the housing 39, which encloses and supports certain driving mechanisms (later referred to) is trunnioned on the cradle 36, but for reasons later set fotrh the latter must be maintained in its supporting or normal position in all positions of the boom section 10b. For this purpose I provide between the support 10x and cradle 36 a linkage which is connected to and operated by one of the links 31a to prevent displacement of the cradle when the boom section 10b is moved in either direction. The linkage consists of the following; 44 indicates a pair of links pivoted at their lower ends at 44x to the opposite sides of a lug 44a fixed to and projecting inwardly from the adjacent cross bar 30; the upper ends of the links 44 straddle and are pivotally connected to the outer end of a rocker 45 which rocks or rotates on the rod 43. The inner end of the rocker 45 below the rod 43 is pivotally connected to the inner end of a rod 45a, the outer end of the latter being adjustably threaded into a fitting 45b, which is pivotally mounted on the adjacent leg 36a of the cradle above the adjacent trunnion bearing 37. From the foregoing description it will be noted that when the boom section 10b is operated upwardly or downwardly, the links 44, the links 31a, the lugs 44a, and the rocker 45 effectively connected between the links 44, 31a constitute a parallelogram-type linkage and are effective to swing the rocker 45 about the rod 43, to maintain the cradle 36 in normal position during movement of and in any position to which the boom section 10b is swung.

The mechanism 31x for swinging the boom section 10b upwardly and downwardly consists of the following: 46 indicates a cylinder having at each end a suitable supply and discharge connection for fluid (see Fig. 16). The opposite diametrical sides of the cylinder 46 are provided with outwardly extending stud shafts 46a which are rotatably mounted in suitable aligned bearings 46b, the housings for the latter being fixedly secured to the inner sides of the channels 34, 34a. The cylinder 46 is provided with a reciprocatable piston 46c, suitably secured to the piston rod 47 extending through the lower head of the cylinder 46. The outer end of the piston rod 47 is pivotally connected to the support 10x; to provide for this connection, the rod is formed with a transverse through opening for a pivot pin 47a which is supported at its opposite ends in lugs 47b fixed to the outer side of the channel 30a (see Fig. 12). It will be noted that when the boom 10b is in normal position, the piston 46c is disposed between the ends of the cylinder 46 and when fluid under pressure is supplied to either end thereof and discharged from its other end, to effect movement of the boom section 10b, the cylinder 46 moves relative to the piston and that the pivotal connections between the piston rod 47 and the support 10x and between the cylinder 46 and channels 34, 34a, permit these parts to move with and relative to the latter.

From the foregoing description, it is to be observed (a) that the inner boom section 10a may be swung upwardly and downwardly independently of the position of the outer boom section 10b relative to the auxiliary support 10x, (b) that the outer boom section 10b may be swung upwardly and downwardly on the support 10x independently of the inner boom section and (c) that in any position of either or both boom sections 10a, 10b, the carriage 12 may be moved endwise of the channels 13a, 13a', and/or the latter slewed in either direction by the mechanism 25; accordingly, in each position or location to which the truck 1 may be driven, the equipment thereon is capable of carrying out the operations hereinbefore referred to over a wide area and where ceilings vary greatly in height. As the swinging mechanism 31x and mounting for the outer boom section 10b are disposed adjacent the inner end portion thereof, the mounting, when operated, effects simultaneously a movement of the boom section 10b upwardly or downwardly and outwardly, so that the drill and other device to be driven by the shafts of the mechanisms, respectively, within the housing 39, can be moved perpendicularly a relatively long distance to first drill a long hole in the ceiling of the excavated area, whereby the inner end portion of the bolt to be positioned in the hole will be well within the earth and rock or other formation above the surface of the ceiling.

The housing 39 encloses two mechanisms 48, 49, having driven shafts 50, 51, respectively, drivingly connected to a main shaft 52, as later set forth, the outer end of the latter shaft being provided with a coupling 52x removably connected to the shaft 53 of a motor 53x—preferably a hydraulic motor having fluid supply and discharge connections 53a, 53a', respectively. The supply of fluid under pressure to the connection 53a and discharge from the connection 53a' is controlled by a valve 53x" having an operating lever 53x'. The shaft 52 extends radially of and at right angles to the shaft 50. When the shaft 50 is in its operative position, it is disposed vertically, as shown in Figs. 3, 7, 8, 9, 10, 12, 13 and 14. The shaft 50 is supported in anti-friction bearings (preferably of the tapered roller bearing type), the outer races of the bearings being seated in the annular walls of aligned openings 39a, 39a', formed in the sections of the casing 39 and held in position by removable caps 39b, 39b', respectively. The hub of a bevel gear 50a, which is keyed to the shaft 50, engages the inner race of the upper bearing, whereas the inner race of the other bearing is engaged by a spacing sleeve 50b between it and the gear 50a. The gear 50a meshes with a pinion 52a on the inner end of the main shaft 52. The shaft 50 extends through the cap 39b and terminates in a screw threaded end portion 50c on which a fitting 54 is removably mounted, as shown in Figs. 8 and 14. The fitting 54 consists of an elongated member, one end of which is formed with an inwardly extending recess 54a having a screw threaded side wall adapted to be threaded on the shaft end 50c, whereas its opposite end is formed with an inwardly extending recess 54b of noncircular shape in cross section arranged to removably receive the correspondingly shaped butt-end 55 of the shank for a drill 55a. The opposite or active end of the drill 55a may be of any preferred form of construction. The length of the drill 55a may vary according to the depth of the hole to be drilled and the depth thereof will be dependent on the kind of earth, rock and mineral formation that forms the ceiling; as shown, the drill is relatively long so as to drill a hole which extends into the ceiling wall to a point where the material thereof is in a substantially solid state. As later set forth, after the hole is drilled, a device is inserted therein, so that by rotating the device or a nut on its outer end a plate or bar may be clamped in engagement with the ceiling A'.

The shaft 52 is mounted in suitable antifriction bearings (preferably of the tapered roller bearing type), one bearing 56 being disposed adjacent the gear 52a and the other bearing 56a being disposed between the coupling 52x and wall of the housing 39. Between the bearings 56, 56a, the main shaft 52 is provided with a bevel gear 57 suitably keyed thereto and meshing with a bevel gear 58 fixed to the shaft 51 to drive the latter (see Fig. 13). The shaft 51 is mounted in inner and outer thrust bearings 59, 60, each preferably of the tapered roller bearing type, disposed on the opposite sides of the gear 58. The outer races of the bearings 59, 60, are mounted in seats formed in the opposed meeting walls of the sections forming the housing 39. The shaft 51 extends into a casing 39c and through a mechanism, indicated as an entirety at 61, therein drives a shaft 62, as later set forth. The shaft 62 extends through and beyond the outer end of the casing 39c, the extended end 62a being of noncircular shape in cross section and providing a connection for a removable fitting 63. The fitting 63 is formed with a through opening 63a the inner portion of which is complementary to the shaft end 62a and is adapted to telescope thereon, as shown in Fig. 8a. The wall at the outer end of the fitting 63a is enlarged and forms a seat 63b for the head of a bolt or screw 64 (see Fig. 15).

The mechanism 61 is preferably of the type which rotates the shaft 62 and simultaneously imparts thereto intermittent impacts; that is, the shaft is continuously rotated through coacting cam elements to initially operate the expansion elements 64a on the inner end portion of the bolt 64 (see Fig. 15), but when resistance to rotation takes place, as the elements 64a are forced into the adjacent earth formation, the coacting cam elements serve to put a spring under tension whereupon one cam element rides the adjacent cam element and through its engagement with a succeeding cam element effects a rotative acceleration on the shaft 62 and thus transmits therethrough an impact on the head of the bolt 64, which operation insures movement of the expansion elements into final position, whereby the ceiling engaging plate 64b is secured in rigid relation by the bolt head to the ceiling A'.

As shown in Fig. 13, the shaft 51 extends through an opening into a cup member 65, the bottom wall of which engages a thrust bearing 65a mounted on the bottom wall of the casing 39c. The wall of the opening is of noncircular shape and the adjacent portion of the shaft 51 is of complementary shape, whereby the cup member 65 is driven. The cup member 65 telescopes into the lower portion of a hollow member 66 the outer end of which is provided with a cap 66a. The hollow member 66 slidably and rotatably fits the side wall of the casing 39c. The side wall of the hollow member 66 is formed with diametrically related openings 66b and the adjacent inner walls of the member are relieved to form elongated recesses 66b', the inner end walls of which form seats 66c. Each of the seats 66c is related to a seat formed in the outer side wall of the cup member 65, the related seats accommodating a ball 67 to provide a driving connection from the member 65 to the hollow member 66. 67a indicates an intermediate shaft between and axially related to the driving shaft 51 and driven shaft 62. The inner end portion of the shaft 67a extends into the member 65 and is enlarged and formed with an axially disposed chamber the walls of which form a bearing for the outer end portion of the shaft 51. The shaft 67a extends loosely through an axial opening formed in the cap 65a and into an inwardly extending opening 68 formed in the head 69 on the inner end of the shaft 62. The outer end portion of the casing 39c is reduced to form a shoulder 39c'. A bushing 70 having a flange 70a at its inner end engages the shaft 62 and head 69 and rotates in a shell 70b, which is formed with an annular recess for maintaining an oil containing fibrous ring or gland. The inner end of the shaft 67a engages the bottom wall of the cup member 65, whereas its outer end engages the end wall of the opening 68. In this arrangement, the shaft 62 is rotatably supported in the reduced end portion of the casing 39c and on the shaft 67a and the latter maintains the head 69 in rotative engagement with the flange 70a. 71 indicates a coiled expansion spring surrounding the shaft 67a and engaging at its opposite ends the bottom of the cup member 65 and cap 66a. The spring 71 tends to bias the hollow member 66 outwardly to maintain the balls 67 in driving relation with the walls of their seats, outward movement of the hollow member being limited by the outer walls of the seats formed in the cup member 65. The inner face of the head 69, adjacent its periphery, is provided with diametrically related cam elements 72, 72a, extending toward the cap 66a, whereas the outer face of the cap 66a, adjacent its periphery is provided with a cam element 73 extending toward the head 69 to provide an overlapping relation with each of the cam elements 72, 72a, when in engagement therewith. From the foregoing description it will be observed that the shaft 51, operating through the cup member 65 and hollow member 66, revolves the cam element 73, which being in engagement with one of the cam elements 72, 72a, drives the shaft 62; accordingly the fitting 63 may be rotated to turn the bolt 64, but when this rotation is resisted by a force sufficient to overcome the tension of the spring 71, the cam element 73 will force the hollow member 66 inwardly against the tension of the spring 71 and ride the adjacent cam element and then engage the other cam element with a quick blow, effecting an impact thereon, which impact operation will be repeated by alternate engagement of the cam element 73 with and riding on the cam elements 72, 72a, until the plate 64b is secured in fixed position against the ceiling A'.

From the foregoing description it will be noted that two mechanisms are provided, one for drilling a hole in a wall to receive a bolt, which operation requires the rotation of a drill, and one for tightening the bolt, which requires a rapid initial rotation of the bolt and a rotational tightening movement effected by means of successive impacts. It will also be noted that the motor driven shaft 52 is drivingly connected to both shafts 50, 51, and both of the latter shafts are driven when the motor 53x is operated, but since one shaft only can be employed when either operation is being carried out, the other shaft idles in its bearings; this arrangement simplifies the construction since mechanisms to alternately connect in and disconnecting each shaft 50, 51, are eliminated.

The equipment herein disclosed is constructed for transportation and operation where ceiling heights or overhead conditions are extremely limited; but the invention is not intended to be limited to such use. The truck chassis is of minimum height and (a) supports the power supply for driving the truck, travel motor and other accessories within the frame members of the chassis and (b) the equipment during transportation of the truck is or may be disposed substantially within the upper surface of the truck chassis. Also, as the support 1x, on which the entire operating equipment (except the fluid supply under pressure source) is mounted, is provided at the front end of the chassis beyond the front wheels and at a level below the top of the chassis, the construction of the chassis is simplified, the assembly therein of the parts above referred to, servicing of these parts and the equipment are facilitated, and enables the equipment to be operated under a wide variety of conditions in excavated areas.

As already set forth, the equipment includes a boom the outer end of which supports a motor drivingly connected to a shaft which through a mechanism, may effect the operation of a tool. To facilitate the employment of separate tools I provide two mechanisms common to the motor driven shaft and swingably mount the motor and mechanisms, as a unit, on a cradle, whereby either mechanism may be positioned for operation.

Operation: The truck 1 is driven to the area which has been excavated. The boom 10 is then slewed, if necessary, to position the outer end of the boom section 10b below that portion of the ceiling or roof A' into which the hole B is to be drilled. With the boom 10 in normal position, the drill 55a is mounted in the fitting 54; if the ceiling is too low or drill too long to accommodate the latter, fluid under pressure is supplied to the lower end of cylinder 46 to move the boom section 10b to a position x (Figs. 1, 7, 8 and 12), which will permit the drill 55a to be positioned in the fitting 54, whereas if the ceiling or roof A' is high, the boom section 10a is swung upwardly to raise the support 10x to an elevated level x' (as shown in Fig. 7) to position the active end of the drill 55a in position to start drilling. With the boom 10b in position x or in either position x', x'', and drill 55a mounted in the fitting 54, the motor 53x is started to drive the shaft 50 and rotate the drill 55a and then fluid under pressure is supplied to upper end of cylinder 46 the effect of which is simultaneously to swing the boom section 10b upwardly and outwardly, to maintain the axis of the shaft 50 during movement thereof coaxially with the axis of the hole B to be drilled (see dotted line a in Fig. 7), as shown in dotted lines in Fig. 2. After the hole B is drilled, the motor 53x is stopped and the fluid pressure is supplied to the lower end of cylinder 46 to swing the boom 10b downwardly to remove the drill 55a from the hole B. Next, the drill 55a is removed from the fitting 54, the housing 39 is swung to the position shown in Fig. 8a, a fitting 63 is mounted on the shaft end 62a, the head of a bolt 64 carrying a plate 64b is mounted in the fitting 63, boom section 10b raised, the bolt being initially guided into the hole, the raising of the boom being continued until the plate 64b engages the ceiling or roof A' and finally the motor 53x is operated, whereby the mechanism 61 operates in the manner already set forth to rotate the bolt and clamp the plate 64b in position.

74 indicates an attachment mounted on the support and arranged to engage the shank of the drill while the latter is being moved into engagement with the ceiling so as to insure such engagement at the position selected for drilling. The attachment 74 consists of a rod 74a the outer end of which is adjustably threaded into the inner end of an extension 75. The outer end of the extension 75 is formed with a vertically extending recess forming a seat for the drill shank. The inner end of the rod 74a is pivotally connected to a screw 75a threaded into a radially extending opening formed in a collar 75b. The collar 75b rotatably fits the rod 33b (see Fig. 10) between annuli 76 suitably fixed to the inner ends of sleeves 76a, which surround the rod 33b and form spacers between the annuli 76 and end portions of the yoke 33a. When the attachement 74 is positioned in engagement with the drill shank it is mounted on a rest 77. The rest 77 consists of a bolt adjustably threaded through an opening formed in an angle 77a, which is suitably fixed at its opposite ends on the opposed faces of the plates 10x'. When the attachment is not in use, it is disengaged from the rest 77 and swung laterally about the pivot 75a and laid on the sleeve 41a.

Fig. 16 illustrates diagrammatically the hydraulic system comprising the following; 78 indicates a reservoir for the liquid having connections 78a, 78b, with the pumps 79, 79a, respectively, which are driven by a suitable motor (not shown). The output side of the pump 79a is connected by the pipe 53a to one side of the motor 53x, the other side thereof being connected by the return pipe 53a' to a main return line 80. The pipe 53a is connected by a branch supply pipe 81 to the valve 53x' and the latter is connected by a return branch pipe 81a to the pipe 53a'. When the valve 53x'' is in neutral position, the liquid circulates through pipe 53a, pipe 81, valve 53x'', pipe 81a, pipe 53a' and return line 80 to the reservoir 78; when valve 53x' is operated, the circulation therethrough from pipe 81 to pipe 81a is cut off so that the liquid is supplied through pipe 53a to the motor 53x to drive the latter and is discharged therefrom through pipe 53a' and main return line 80 to the reservoir 78. The output side of the pump 79 is connected by a pipe 82 to one end of the valve casing 82a on which the valves 26x', 21x, 17e and 46x are mounted. When these valves are in neutral position the supplied liquid under pressure flows therethrough to return pipe 83, which is connected to return pipe 80, and pipe 84, which is connected to the valve for operating the piston in the cylinder 7x.

Each of the valves in the casing 82a may be operated independently of the other valves without affecting the supply of the liquid to the latter and flow through the latter to the return pipe 83 and when each valve 26x', 17e and 46x is operated to supply fluid pressure to the adjacent cylinder the discharge of the liquid from the cylinder is connected through the operated valve and the succeeding valves to the return pipe 83, whereas when valve 21x is operated to one position fluid pressure is supplied through pipe 85 to cylinder 21 to raise the boom and when the valve 21x is moved to its other position to permit the boom 10a to gravitate, the liquid is discharged through pipe 85 to the valve and flows therethrough and valves 17e and 46x to the return pipe 83. To slew the boom in either direction, the opposite ends of the cylinder 26x are connected by pipes 86, 86a, to the valve 26x'; when the valve 26x' is operated to one position to slew the boom in one direction, the liquid is supplied through the pipe 86 to one end of the cylinder and discharged therefrom through the pipe 86a to the valve for return through valves 21x, 17e, 46x to return pipe 83, whereas when the valve is operated to its other position to slew the boom 10 in the opposite direction, fluid pressure is supplied through pipe 86a to the other end of the cylinder 26x and discharged therefrom through the pipe 86 to the valve for return through valves 21x, 17e, 46x to return pipe 83. To effect travel of the boom 10 in either longitudinal direction, the valve 17e is connected by pipes 87, 87a, to the opposite ends of the cylinder 17. Valve 17e operates to control the fluid flow to and from the opposite ends of the cylinder 17 in the same manner as valve 26x'. To raise and lower the boom section 10b, valve 46x is connected by pipes 88, 88a, to the opposite ends of the cylinder 46. Valve 46x operates to control the flow of liquid to and from the cylinder 46 in the same manner as valves 26x' and 17e.

As already set forth, the valve for operating the piston in the cylinder 7x is operated by the steering wheel 5a. When the wheel 5a is in normal position and wheels in non-steering position, the liquid supplied to pipe 84 flows through valve to return pipe 84a and to the reservoir 78. When the steering wheel 5a is operated in either direction, the valve operates to supply the liquid to one side of the piston in the cylinder and effect discharge of the liquid in the cylinder on the opposite side of the piston therein to pipe 84a. All of the valves 26x', 21x, 17e, 46x and 53x' are of standard construction, for which reason they are not more fully illustrated.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

Having thus described my invention, I claim:

1. In a truck for operating in an excavated area having, in combination, a wheel supported frame, supporting means on said frame, a pair of plates in fixed spaced relation pivotally mounted on said supporting means, a boom, a mechanism between said boom and said plates for supporting and moving said boom relative to said plates, said mechanism consisting of a pair of links normally disposed parallel to said boom and pivotally connected at their outer ends to said plates and at their inner ends to said boom, a separate pair of links, rearward of said first mentioned pair of links, and normally disposed at substantially right angles to said boom and pivotally connected at their lower ends to said plates and at their upper ends to said boom and a cylinder element and a cooperating piston element pivotally connected to said boom and said plates, respectively, for simultaneously swinging said boom vertically and said pairs of links relative to said plates, said pairs of links serving to move said boom outwardly during vertical movement thereof, a source of fluid supply under pressure on said frame, valve controlled fluid connections between said source of fluid supply and the opposite ends of said cylinder element, and a support on the outer end of said boom.

2. A wheel supported mechanism comprising, in combination, a frame, a source of fluid under pressure supply on said frame, supporting means on said frame, a sectional boom consisting of an inner boom section pivotally mounted on said supporting means, a pair of plates pivotally mounted on the outer end of said boom section and an outer section movably mounted on said plates, cylinder-piston elements between said supporting means and said inner boom section for swinging the latter vertically, the mounting for said outer boom section consisting of a pair of links normally disposed parallel to said outer boom section and pivotally connected at their outer ends to said plates and at their inner ends to said outer boom section, a separate pair of links rearward of said first mentioned pair of links and normally disposed at substantially right angles to said outer boom section and connected at their lower ends to said plates and at their upper ends to said outer boom section, cylinder-piston elements pivotally connected to said plates and said outer boom section, respectively, for swinging said outer boom section vertically relative to said plates, said pairs of links serving to move said outer boom section outwardly during vertical movement thereof, separate valve controlled connections between said source of fluid supply and each of said cylinder elements, and a power operated mechanism mounted on the outer end of said outer boom section.

3. A mechanism as claimed in claim 2 wherein said inner boom section consists of two equal length parallel members pivotally connected at their opposite ends to said supporting means and said plates for maintaining said plates in position to support the mounting for said outer boom section during vertical movement of said inner boom section.

4. In a wheel supported mechanism comprising, in combination, a frame, a carriage slidably mounted on said frame, mechanism for sliding said carriage, a boom pivotally mounted at its inner end on said carriage, mechanism between said carriage and said boom for swinging the latter upwardly, a pair of plates pivotally suspended from the outer end of said boom, a separate boom, mechanism between said separate boom and said plates for swingably supporting said separate boom on the latter, a support on the outer end of said separate boom, a power operated mechanism mounted on said support, and a link disposed parallel to said first-mentioned boom and connected at its opposite ends to said carriage and said plates to prevent displacement of said plates as they move upwardly and downwardly with said first-mentioned boom.

5. In apparatus of the class described, the combination with a wheel mounted frame and a support mounted on said frame to rotate about a vertical axis of a main boom having one end mounted on said support and extending outwardly therefrom, means operatively connected to said boom for swinging the latter about said axis, a pair of spaced plates extending outwardly from the other end of said main boom and mounted at their inner ends on the other end of said main boom, a separate boom, mechanism between said plates and said separate boom for swingably supporting said separate boom on said plates, said mechanism consisting of pairs of links disposed horizontally and parallel to said plates when said separate boom is horizontal and pivotally connected at their outer ends to the latter and connected at their inner ends to said separate boom, separate pairs of links rearward of said first-mentioned pairs of links and normally disposed substantially vertically and pivotally connected at their upper ends to the inner end portion of said separate boom and at their lower ends to the inner end portions of said plates, cooperating cylinder and piston elements operatively connected to said plates and said separate boom, respectively, for swinging the latter vertically, the opposite ends of said cylinder element being adapted to be connected to a valve-controlled fluid under pressure supply system, a cradle pivotally mounted on the outer end of said separate boom, and a rod between and operatively connected at its opposite ends to one link of said last-mentioned pairs of links and said cradle for preventing displacement of the latter during swinging movement of said separate boom.

6. In an industrial truck having a frame, a boom pivotally mounted at one end thereof on said frame and extending outwardly from said one end, means for swinging said boom vertically, a pair of spaced fixedly related plates disposed in substantially endwise relationship to said boom and having ends adjacent to said boom pivotally connected to the outer end of said boom, said plates extending outwardly away from the outer end of said boom, link means defining with said boom a parallel motion linkage for maintaining said plates in a predetermined relationship to the horizontal and vertical during swinging movement of said boom, a separate boom disposed between said plates, a support swingably mounted on said separate boom, a motor driven mechanism on said support, a shaft on said support and driven by said mechanism and adapted to engage and rotate a device, a linkage connecting one of the ends of said separate boom to said plates and supporting said separate boom for swinging movement in a vertical plane while maintaining the other of the ends of the separate boom along an imaginary vertical line, power actuated means operatively connected between said separate boom and said plates for swinging said separate boom, and means operatively connected between said support and said plates for maintaining said support in a predetermined position with respect to the horizontal and vertical during the swinging movement of said separate boom.

7. In apparatus for positioning supports for ceilings in excavated areas, the combination with a wheel mounted frame, of supporting means on said frame, a boom, a support swingably mounted on the outer end of said boom, a mechanism including geared together shafts and a motor drivingly connected to one of said shafts, means movably mounting said mechanism on said support for selectively positioning said shafts for operation on a vertically disposed axis, one of said shafts being adapted to removably engage and rotate a device in the material of the ceiling in an excavated area, and means connected between said supporting means and said boom for swinging the latter upwardly and outwardly and maintaining the adjacent shaft axially of said axis during movement of said boom, said last-mentioned means comprising a support movable in a vertical plane and pairs of links normally disposed horizontally when said boom is horizontal and pivotally connected to said support and said boom and pairs of links rearwardly of said first-mentioned pairs of links normally disposed vertically when said boom is horizontal and pivotally connected to said supporting means and said boom and power operated means operatively connected between said supporting means and said boom.

8. In an apparatus of the class described, the combination with a wheel mounted frame, of supporting means on said frame, a member extending outwardly from said supporting means, means connecting one end of said member to said supporting means and mounting said member for vertical swinging movement relative to said frame, power means operatively connected to said member for vertically swinging said member, a support, means pivotally mounting said support at one end to the other end of said swingable member, a linkage between said support means and said support for maintaining the latter in a predetermined relationship relative to the horizontal and vertical during the vertical swinging movement of said member, a boom, a mechanism including a vertically disposed shaft and a motor drivingly connected thereto mounted on one end of said boom, a device on one end of said shaft adapted to support a tool, and means operatively connecting the other end of said boom to said support and mounting said boom for swinging movement upwardly and outwardly in a vertical plane while maintaining the axis of said shaft along a predetermined vertical line during movement of said boom.

9. In apparatus for drilling holes in ceilings in excavated areas, the combination with a wheel mounted frame, of supporting means on said frame, said supporting means including a pair of fixedly related plates, of a boom, a pair of links normally disposed parallel to said boom and pivotally connected at their outer ends to the outer end portions of said plates and at their inner ends to said boom, a separate pair of links rearward of said first mentioned pair of links and normally disposed substantially vertically and pivotally connected at their upper ends to the inner end portion of said boom and pivotally connected at their lower ends to the inner end portions of said plates, cylinder-piston elements pivotally connected to said plates and said boom, respectively, for raising the latter, said pairs of links serving to move said boom outwardly during raising thereof to maintain the outer end of said boom coincident with an imaginary vertical axis, a cradle swingably suspended from the outer end of said boom and adapted to support a power unit having a vertically disposed shaft for rotating a device, and connections between one of the links of said last mentioned pair of links and said cradle for maintaining the latter in fixed relation to said imaginary axis during movement of said boom.

10. An apparatus as claimed in claim 9 wherein is provided a rod pivotally mounted at its inner end in said supporting means for removably engaging the device to maintain it vertically while being moved into engagement with the ceiling.

11. In apparatus for positioning and tightening bolts carrying supporting plates for ceilings in excavated areas, the combination with a wheel mounted frame, of supporting means on said frame, a boom mounted on said supporting means for swinging movement vertically and extending outwardly therefrom, a support pivotally mounted on the outer end of said boom, a mechanism mounted on said support, said mechanism including a vertically disposed shaft comprising of inner and outer aligned sections, a motor drivingly connected to said inner shaft section, means for driving said motor, driving connections between said shaft sections, said driving connections comprising a plurality of spacedly related cam elements eccentrically mounted on the inner end of said outer shaft section, inner and outer drivingly connected and relatively movable members surrounding said inner shaft section, said inner member being drivingly connected to said inner shaft section and the outer end of said outer shaft section being adapted to engage the head of a bolt and project the bolt into a hole in the ceiling and, upon driving said motor, to rotate the bolt, a spring between said relatively movable members arranged to bias said outer member outwardly, a separate cam element eccentrically mounted on the outer end of said outer member and arranged to engage one of said first-mentioned cam elements to rotate said outer shaft section, said last-mentioned cam element in response to resistance in tightening the bolt being adapted to move inwardly in opposition to said spring and successively ride said first-mentioned cam elements and engage the adjacent first-mentioned cam elements, respectively, to transmit successive impacts on said outer shaft section, and coordinated means operatively connected between said supporting means and said support and said boom for swinging the latter upwardly and outwardly and maintaining said support in a predetermined position to move said shaft axially during movement of said boom vertically.

12. In an apparatus for bolting supports to ceilings in excavated areas, the combination with a wheel mounted frame, of supporting means on said frame, a boom having inner and outer ends and extending outwardly from said supporting means, means operatively connecting the inner end of said boom to said supporting means and mounting said boom for swinging movement in a vertical plane, a mechanism mounted on the other end of said boom and including a motor and a first shaft driven thereby, a separate shaft spaced from but aligned with said first shaft and adapted to support a seating member for the element of a screw threaded device, driving connections between said first shaft and said separate shaft, said driving connections comprising coacting cam elements disposed eccentrically to said shaft, one of said cam elements being fixed to one shaft and the other of said cam elements being slidably mounted on the other shaft, a spring between said other shaft and said last-mentioned cam element for biasing the latter outwardly away from said one end of said boom to yieldably maintain the last-mentioned cam element in position to engage the other cam element and upon rotation of said driven shaft to initially rotate said separate shaft, said last-mentioned cam element, in each revolution of said driven shaft, being arranged to ride said first-mentioned cam element in response to resistance in tightening the element and to reengage said first-mentioned cam element to transmit impacts on said separate shaft, said means operatively connecting said boom to said supporting means including mechanism operatively connected to said boom for swinging the latter outwardly as said boom is moved upwardly to maintain said shafts in a predetermined vertical axis during vertical swinging movement of said boom.

13. An apparatus of the class described comprising, in combination, a wheel mounted frame, parallel guides on said frame adjacent one end thereof, a carriage slidably mounted on said guides, a cylinder element and a cooperating piston element between and connected to said guides and said carriage, respectively, for reciprocating the latter, a boom consisting of an inner section pivotally mounted at its inner end on said carriage, a pair of parallelly spaced plates pivotally mounted on the outer end of said boom section and an outer boom section pivotally supported on said plates, a combined supporting and moving mechanism for said outer boom section between the latter and said plates, said mechanism consisting of a cylinder element and a cooperating piston element, respectively, connected to said plates and outer boom section for moving the latter vertically, a pair of links disposed parallel to said outer boom section when the latter is horizontal and pivotally connected at their outer ends to the outer ends of said plates and at their inner ends to said outer boom section and a separate pair of links normally disposed substantially at right angles to said outer boom section when the latter is horizontal and pivotally connected at their lower ends to said plates and at their upper ends to said outer boom section, said pairs of links serving to move said outer boom section outwardly during vertical movement thereof, coacting power operated devices between said carriage and said inner boom section for moving the latter vertically, a source of fluid supply under pressure mounted on said frame, valve controlled fluid connections between said source of fluid supply and said first-mentioned cylinder element and cooperating piston element, separate valve controlled fluid connections between said source of fluid supply and said last-mentioned cylinder element and cooperating piston element, and a separate support on the outer end of said outer boom section adapted to support a rotary power mechanism.

14. An apparatus as claimed in claim 13 wherein said coacting devices consist of a cam on said carriage and a slide reciprocatably guided on said inner boom section and arranged to engage said cam, and cylinder-piston elements having valve controlled connections with said source of fluid supply mounted on said inner boom section for operating said slide.

15. An apparatus as claimed in claim 13 wherein connections are provided between said carriage and said plates for preventing displacement of the latter during swinging movement of said inner boom section.

16. An apparatus as claimed in claim 13 wherein a power mechanism is trunnioned on said separate support, said mechanism consisting of a main shaft, drivingly connected shafts disposed radially of the axis of said main shaft for driving the latter, the axes of said main shaft and said drivingly connected shafts having a common point of intersection with the axis of the trunnions, and a motor connected to one of said driving shafts for driving the latter.

17. An apparatus of the class described comprising, in combination, a wheel mounted frame, parallel guides on said frame adjacent one end thereof, a carriage slidably mounted on said guides for endwise movement both inwardly and outwardly with respect to the central portion of said frame and having inner and outer ends, a boom pivotally mounted at one end on the inner end of said carriage and extending outwardly therefrom, said carriage having a plate providing a cam extending outwardly and downwardly from the inner end portion of said carriage, said boom being provided with longitudinally extending guides, a slide mounted on said last-mentioned guides and provided with a device arranged to engage and ride said cam for swinging said boom upwardly, cylinder-piston elements between and connected to said first-mentioned guides and said carriage, respectively, for reciprocating the latter, cylinder-piston elements between and connected to said last-mentioned guides and slide, respectively, for reciprocating the latter, a source of fluid supply under pressure on said frame, separate valve controlled fluid connections between said source of fluid supply and said cylinder-piston elements, respectively, and supporting means on the outer end of said boom for supporting a power mechanism.

18. A portable apparatus for drilling holes in ceilings comprising, in combination, a wheel mounted frame, a source of supply of fluid under pressure, supporting means on one end portion of said frame, said means including a pair of spaced plates, a boom, means for movably mounting said boom on said plates, a cradle supported on the outer end of said boom, a driving mechanism on said cradle, a vertically disposed shaft drivingly connected to said mechanism, a motor on said cradle for driving said mechanism, said shaft being adapted to engage and rotate a drill during movement of said boom, said boom mounting means comprising a cylinder element and a cooperating piston element pivotally connected to said boom and said plates, respectively, for moving said boom vertically, a pair of links normally disposed parallel to said boom and pivotally connected at their outer ends to said plates and at their inner ends to said boom, and a separate pair of links normally disposed substantially at right angles to said boom and pivotally connected at their upper ends to the boom and at their lower ends to said plates, said pairs of links serving to move said boom outwardly during vertical movement thereof to bodily maintain said shaft in a coincident relation to a predetermined, imaginary, vertical axis, and valve controlled connections between said source of fluid supply and said cylinder element.

19. An apparatus as claimed in claim 18 wherein said driving mechanism is trunnioned on said cradle and consists of two geared together shafts one of which is driven by said motor to drive said drill rotating shaft, the axes of said drill rotating shaft and said geared together shafts being in angular relation and said axes of said drill rotating shaft and said geared together shafts intersect the axis of said trunnions at the same point, whereby either geared together shaft may be positioned coincidentally with said vertical axis.

20. A drilling machine including a frame, a pair of upright parallel links pivotally supported at the bottoms thereof on the frame, a rocker plate connecting the tops of said parallel links to swing together forwardly and rearwardly with respect to said frame, a forwardly directed boom pivotally connected at its rear end to said parallel links to be extended and retracted in accordance with the forwardly and rearwardly swinging movement of said parallel links, a drill mechanism pivotally supported on the forward end of the boom, means for swinging said boom upwardly and downwardly about the axis of the pivotal connection of the boom to the parallel links to raise and lower the drill mechanism, a link pivotally connected between the boom and the frame for constraining the movement of the forward end of the boom to a straight upright line as the boom is swung upwardly and downwardly, and a link pivotally connected between the drill mechanism and said rocker plate to maintain said drill mechanism parallel to said straight upright line as the boom is swung upwardly and downwardly.

21. In a vehicle having a chassis including a frame, an articulated boom comprising inner and outer boom sections, means connecting the adjacent ends of said boom sections to one another for relative angular movement in a vertical plane, pivot means connecting the other end of said inner boom section and in turn said boom to said frame for oscillation in a generally vertical plane, and in a generally horizontal plane and for linear movement in a generally horizontal plane, a carrier, means connecting said carrier to the other end of said outer boom section for relative angular movement in a vertical plane with respect to said outer boom section, first means operatively connected to said frame and to said boom for producing relative angular movement between said inner and outer boom sections upon oscillation of said boom, and second means operatively connected to said carrier and to said boom for producing relative angular movement between said carrier and said outer boom section upon angular movement of said outer boom section in a vertical plane.

22. In a vehicle having a chassis, a carriage, means supporting said carriage on said chassis for linear movement relative thereto in a generally horizontal plane, an articulated boom comprising inner and outer boom sections, means connecting the adjacent ends of said boom sections to one another for relative angular movement in a vertical plane, pivot means connecting the other end of said inner boom section and in turn said boom to said carriage for oscillation in a generally vertical plane, a carrier, means connecting said carrier to the other end of said outer boom section for relative angular movement in a vertical plane with respect to said outer boom section, first means operatively connected to said carriage and to said boom for producing relative angular movement between said inner and outer boom sections upon oscillation of said boom, and second means operatively connected to said carrier and to said boom for producing relative angular movement between said carrier and said outer boom section upon angular movement of said outer boom section in a vertical plane.

23. A vehicle having a chassis, a carriage, means supporting said carriage on said chassis for linear movement relative thereto in a horizontal plane, an articulated boom comprising inner and outer boom sections connected for relative angular movement and an intermediate member carried by said boom adjacent the outer end of said inner boom section, means pivotally connecting the inner end of said inner boom section to said carriage and mounting said boom on said carriage for angular movement in a vertical plane, means connecting said intermediate member to said boom and permitting angular movement thereof relative to said boom sections and in a vertical plane, a carrier, means connecting said carrier to the outer end of said outer boom section for relative angular movement with respect thereto in a vertical plane, first link means pivotally connected to said carriage and to said intermediate member and cooperating with said inner boom section to effect relative angular movements of said intermediate member and said outer boom section in a predetermined manner with respect to said inner boom section as the latter is swung angularly in a vertical plane, and second link means pivoted to said intermediate member and to said carrier and cooperating with said outer boom section to effect relative angular movement between said outer boom section and said carrier in a predetermined manner as the outer boom section is swung angularly in a vertical plane.

References Cited in the file of this patent

UNITED STATES PATENTS

| | | |
|---|---|---|
| 1,754,348 | Browne | Apr. 15, 1930 |
| 1,885,295 | Robinson | Nov. 1, 1932 |
| 1,978,513 | Talboys | Oct. 30, 1934 |
| 1,997,247 | Cartlidge | Apr. 9, 1935 |
| 2,049,273 | Pott | July 28, 1936 |
| 2,123,897 | Holmes | July 19, 1938 |
| 2,410,508 | Lamme | Nov. 5, 1946 |
| 2,456,056 | Fellay et al. | Dec. 14, 1948 |
| 2,491,273 | Lehner | Dec. 13, 1949 |
| 2,557,637 | Danuser | June 19, 1951 |
| 2,581,667 | Joy | Jan. 8, 1952 |
| 2,591,323 | Webb | Apr. 1, 1952 |
| 2,649,979 | Ball | Aug. 25, 1953 |
| 2,698,735 | Lehner | Jan. 4, 1955 |